(12) United States Patent
Julliand et al.

(10) Patent No.: US 11,502,560 B2
(45) Date of Patent: Nov. 15, 2022

(54) ASSEMBLY COMPRISING A HOUSING AND A STATOR INSERTED INSIDE SAID HOUSING

(71) Applicant: AETC SAPPHIRE LLC, Saint Petersburg (RU)

(72) Inventors: Lionel Julliand, Belfort (FR); Fabien Roche, Champigneulles (FR); Pierre Humbert, Champigneulles (FR); Jan Hemmelmann, Garching Bei Munchen (DE)

(73) Assignee: AETC SAPPHIRE LLC, Saint Petersburg (RU)

( * ) Notice: Subject to any disclaimer, the term of this patent is extended or adjusted under 35 U.S.C. 154(b) by 0 days.

(21) Appl. No.: 16/956,955

(22) PCT Filed: Nov. 9, 2018

(86) PCT No.: PCT/EP2018/080726
§ 371 (c)(1),
(2) Date: Jun. 22, 2020

(87) PCT Pub. No.: WO2019/120742
PCT Pub. Date: Jun. 27, 2019

(65) Prior Publication Data
US 2021/0006104 A1  Jan. 7, 2021

(30) Foreign Application Priority Data

Dec. 22, 2017 (FR) ........................................ 1763022

(51) Int. Cl.
*H02K 1/18* (2006.01)
*H02K 5/04* (2006.01)
*H02K 15/02* (2006.01)
*B63H 5/125* (2006.01)
*H02K 15/14* (2006.01)

(52) U.S. Cl.
CPC ............. *H02K 1/185* (2013.01); *B63H 5/125* (2013.01); *H02K 5/04* (2013.01); *H02K 15/028* (2013.01); *H02K 15/14* (2013.01); *B63H 2005/1258* (2013.01)

(58) Field of Classification Search
CPC ......... H02K 1/185; H02K 15/028; H02K 5/04
USPC .......................... 310/40 R, 216.118, 216.127
See application file for complete search history.

(56) References Cited

U.S. PATENT DOCUMENTS 10,135,316 B2    11/2018  Carrasco
2016/0285342 A1*  9/2016  Carrasco ................. H02K 1/12

FOREIGN PATENT DOCUMENTS

| EP | 0911948 A2 * | 4/1999 | ............. H02K 1/185 |
| EP | 0911948 A2 | 4/1999 | |
| EP | 1320173 A2 * | 6/2003 | ............. H02K 1/185 |
| EP | 1320173 A2 | 6/2003 | |
| KR | 20150100939 | * 9/2015 | |
| WO | 2019/120742 A1 | 6/2019 | |

OTHER PUBLICATIONS

International Search Report from PCT Appl. No. PCT/EP2018/080726. dated Jan. 8, 2019.

* cited by examiner

*Primary Examiner* — Jose A Gonzalez Quinones
(74) *Attorney, Agent, or Firm* — Wood IP LLC (57) ABSTRACT

The disclosed assembly comprises a housing and a stator inserted inside a cylindrical cavity in said housing. Said assembly comprises a means for point-to-point attachment of the stator to the housing.

14 Claims, 8 Drawing Sheets

ASSEMBLY COMPRISING A HOUSING AND A STATOR INSERTED INSIDE SAID HOUSING

The present invention relates to an assembly comprising a hollow housing and a stator inserted inside said housing, and more particularly such an assembly intended to be incorporated into a pod.

In numerous applications, it is necessary to create an integral assembly comprising a housing and a stator inserted inside the housing.

For example, in marine vehicles such as ships, submarines or oil platforms, a pod conventionally comprises an electric motor. The electric motor includes in particular a rotor rotatably mounted with respect to a stator. The stator forms an integral assembly with a housing of the pod.

Conventionally, to create such an integral assembly, a housing comprising a cylindrical cavity is heated so as to cause an increase in the volume of the cylindrical cavity. The stator is inserted inside the cavity of the housing. During the cooling of the housing, the stator is shrink-fitted into the cavity and made integral with the housing.

Such integral assemblies have, however, the disadvantage of it not being possible to disassemble them.

Moreover, in many applications, the housing may be subjected to significant impacts. For example, a housing intended for a pod of an icebreaker ship may frequently come in contact with blocks of ice. This results in the appearance of significant deformations and vibrations on the housing. These deformations and/or these vibrations are transmitted to the stator shrink-fitted inside the housing. The deformations and/or the vibrations of the stator that result therefrom can lead to a failure of the electric motor.

Given the above, the goal of the invention is to allow the creation of an integral assembly comprising a housing and a stator, easy to assemble, capable of being disassembled and in which the effect of the impacts on the housing produces as few deformations and vibrations as possible on the stator.

For this purpose, an assembly is proposed comprising a housing and a stator inserted inside a cylindrical cavity of said case, characterised in that said assembly comprises a means for point-to-point attachment of the stator to the housing.

Thanks to such means for point-to-point attachment, it is possible to dispose the means for attachment in zones of minimal deformation of the housing. The transmission of the deformations and/or of the vibrations from the housing to the stator is thus minimised. The stator is thus preserved as much as possible so as to limit the risk of a failure of the stator following a particularly strong impact or a repetition of impacts.

The present invention is very particularly advantageous when the assembly is intended to be incorporated into a pod of a marine vehicle. Indeed, in such an application, the pod cases are particularly subjected to impacts on the lateral faces tending to give the housing an oval shape. In this case, four zones are slightly deformed and form ideal zones for incorporating a means for point-to-point attachment therein. However, it should not be forgotten that the invention can apply to other fields of application.

Advantageously, said means for point-to-point attachment is capable of implementing a maintaining stress directed according to the radial orientation and/or a maintaining stress directed according to the tangential orientation.

The implementation of these maintaining stresses can easily be ensured by the same means for point-to-point attachment. Unless otherwise indicated, the terms "axial", "radial" and "tangential" must be understood as referring to a cylindricity axis of the stator.

In one embodiment, the assembly further comprises a first plane of symmetry, said means for point-to-point attachment being located in an angular sector forming an angle of between 0° and 40° with said first plane of symmetry or in an angular sector forming an angle of between 140° and 180° with said first plane of symmetry.

Such angular sectors correspond to zones of minimal deformation when the housing is affected by impacts occurring on its lateral surfaces. By choosing such angular sectors, the transmission of the deformations and/or of the vibrations of the housing onto the stator is thus minimised. Such an assembly is thus particularly adapted to being incorporated into pods intended for icebreaker ships.

There can also be at least one pressure bolt located in an angular sector forming an angle of between 1.5° and 6.5° with said first plane of symmetry, and at least one pressure surface located in an angular sector forming an angle of between 155° and 180° with said first plane of symmetry.

This pressure bolt and this pressure surface allow to increase the robustness of the maintaining stress directed according to the radial orientation. Moreover, their location in the aforementioned angular sectors allows to facilitate the access of an operator to the pressure bolts.

In one embodiment, the stator comprises two end flanges respectively located at the two axial ends of the stator, said assembly comprising, for each end flange of the stator, a first means for point-to-point attachment located in an angular sector forming an angle of between 0° and 40° with said first plane of symmetry, a second means for point-to-point attachment located to be symmetrical to the first means for point-to-point attachment with respect to the first plane of symmetry, a third means for point-to-point attachment located in an angular sector forming an angle of between 140° and 180° with said first plane of symmetry, and a fourth means for point-to-point attachment located to be symmetrical to the third means for point-to-point attachment with respect to the first plane of symmetry.

In such an embodiment, the embedding link between the housing and the stator is made robust while minimising the transmission of the deformations and/or of the vibrations of the housing to the stator. Moreover, it is possible to ventilate the stator because of the small surface area of the stator in contact with the housing. Furthermore, the means for point-to-point attachment located at a flange at an axial end of the stator are made easy to access.

It is also possible for the stator to comprise at least one intermediate flange axially located between the end flanges, said assembly comprising, for each intermediate flange of the stator, a first means for point-to-point attachment located in an angular sector forming an angle of between 0° and 40° with said first plane of symmetry and a second means for point-to-point attachment located to be symmetrical to the first means for point-to-point attachment with respect to the first plane of symmetry.

Thus, the robustness of the embedding link between the housing and the stator is reinforced even more. Because only two means for point-to-point attachment are provided for each intermediate flange, the access to these means for point-to-point attachment is facilitated.

In one embodiment, said means for point-to-point attachment comprises a main body and a taper washer system capable of selectively rigidly connecting the main body to the housing and to the stator.

Such a means for attachment can easily be installed or disassembled, or tightened. The installation, the elimination or the adjustment of the embedding link of the housing and of the stator are thus facilitated.

In one embodiment, said main body comprises a plate and a part having a trapezoidal cross-section, said means for point-to-point attachment comprising two pairs of taper washers respectively located on either side of a second plane of symmetry of the main body, each taper washer being capable of moving in translation with respect to the main body according to a first orientation perpendicular to the plane of the plate, the inclined surface of each taper washer cooperating with an inclined surface of the part having a trapezoidal cross-section in such a way that the movement in translation according to the first orientation of said taper washer with respect to the main body in a direction tending to move said taper washer away from the plate causes a movement of the taper washer in translation with respect to the main body according to a second orientation perpendicular to the second plane of symmetry in a direction tending to move it away from the second plane of symmetry.

Advantageously, for each taper washer, the movement of said taper washer with respect to the main body is implemented via a respective clamping screw.

According to another aspect, a method is proposed in which the deformation of the housing of an assembly as defined above is simulated, said simulation preferably being implemented via a finite-elements model, at least one location of minimal deformation of the cylindrical case is determined, and the means for point-to-point attachment is placed at said location of minimal deformation.

Other goals, features and advantages of the invention will appear upon reading the following description, given only as a non-limiting example, and made in reference to the appended drawings in which.

FIGS. 1 to 4 schematically show a pod 2. The pod 2 is intended to be incorporated into a marine vehicle (not shown) such as a ship, a submarine or an oil platform. Pod is the acronym for "propulsion oriented drive".

Figure 1:
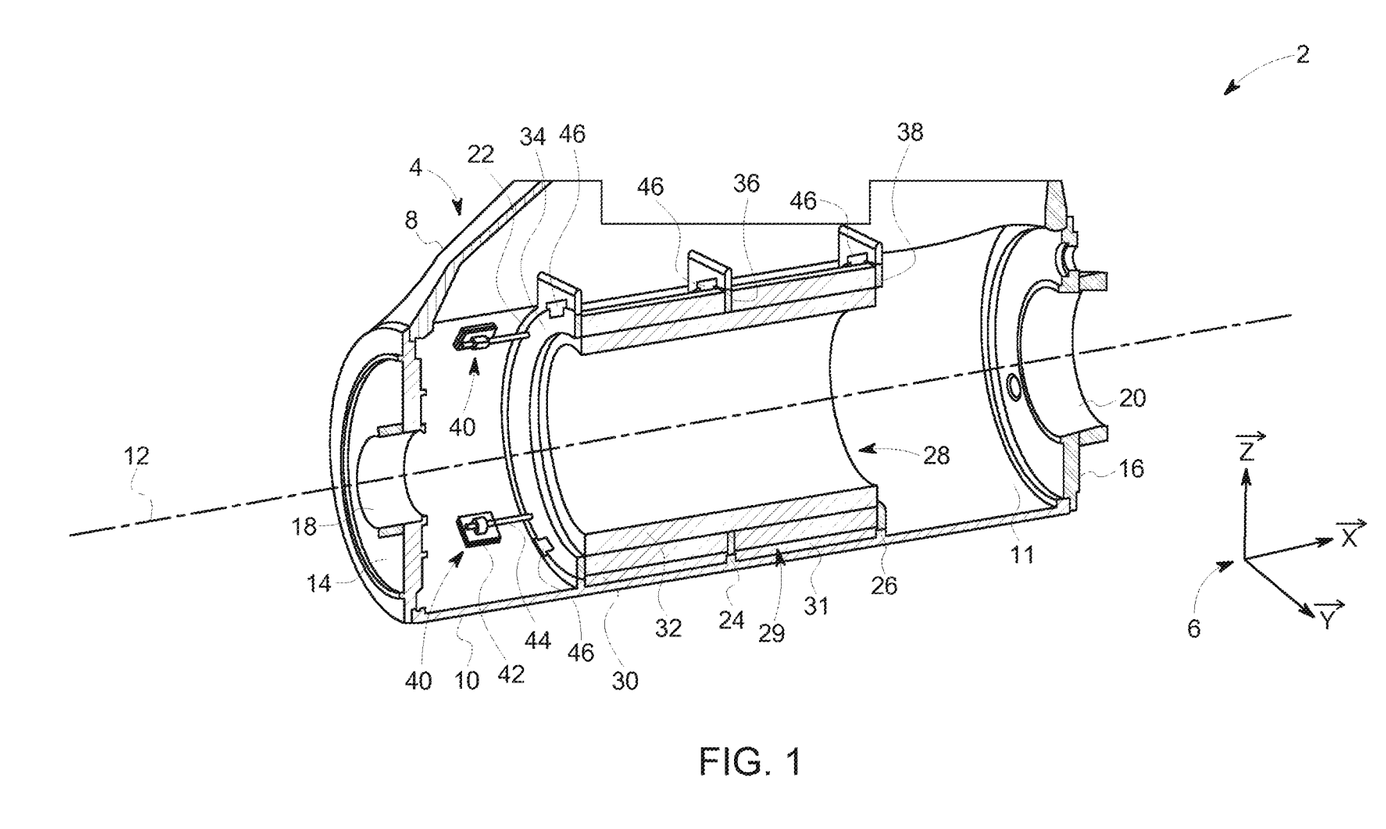
FIG. 1 is a perspective view of an assembly according to the invention.

The pod 2 includes in particular a housing 4 shown in a radial cross-section in FIG. 1. An orthonormal vector basis 6 attached to the housing 4 is defined. The basis 6 consists of a vector $\vec{x}$, a vector $\vec{y}$ and a vector $\vec{z}$. When the pod is normally incorporated into a marine vehicle such as a ship in a dry dock, the plane formed by the vectors $\vec{x}$ and $\vec{y}$ is horizontal, the vector being oriented from the bottom upwards. Unless otherwise indicated, the terms "upper" and "lower" will be understood in the present application as being defined with respect to the orientation and the direction of the vector $\vec{z}$.

The housing 4 is symmetrical with respect to the cutting plane I-I of FIG. 1. The plane I-I is the plane perpendicular to the vector $\vec{y}$ containing the axis 12. For reasons of clarity in FIG. 1, only half of the housing 4 has thus been shown, the other half being able to be deduced by symmetry with respect to the plane I-I.

As illustrated in FIG. 1, the housing 4 consists in particular of an upper connecting portion 8 and a cylindrical portion 10. The portion 8 is connected to a part of the marine vehicle, for example to the hull of a ship. More precisely, the portion 8 can be integral with a ring of a rudder bearing (not shown), the other ring of the rudder bearing being integral with the hull of the ship.

The portion 10 is axisymmetric around an axis 12 parallel to the vector $\vec{x}$. The portion 10 is radially defined by a cylindrical wall (not labelled) comprising an inner surface 11. The inner surface 11 defines a cylindrical cavity (not labelled) around the axis 12. The portion 10 is axially defined by a first front wall 14 and by a second front wall 16. Each front wall 14, 16 respectively comprises a cylindrical bore 18, 20. The bores 18 and 20 are coaxial around the axis 12.

The bores 18 and 20 are intended to receive a propulsion shaft (not shown). The shaft supports a propulsion means capable in particular of being a pod (not shown) or a pump rotor (not shown).

The housing 4 includes three annular flanges 22, 24 and 26. The flanges 22, 24 and 26 are substantially identical and extend radially towards the inside from the surface 11. The axial offset between the flanges 22 and 24 is substantially equal to the axial offset between the flanges 24 and 26.

Figure 2:
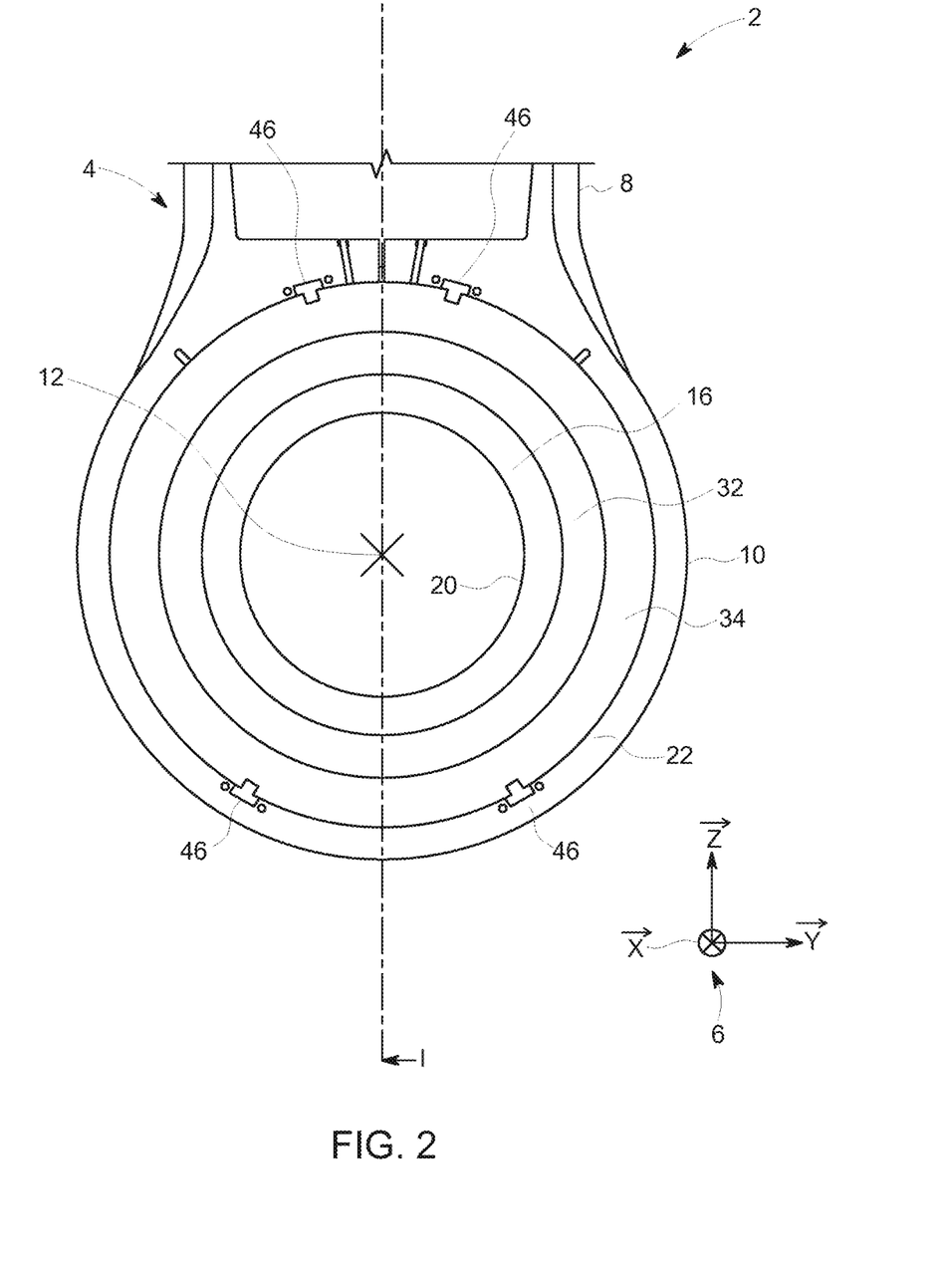
FIGS. 2, 3 and 4 are respectively three cross-sectional views of the assembly of FIG. 1, FIGS. 5 and 6 are two detailed views of FIG. 4.
Figure 3:
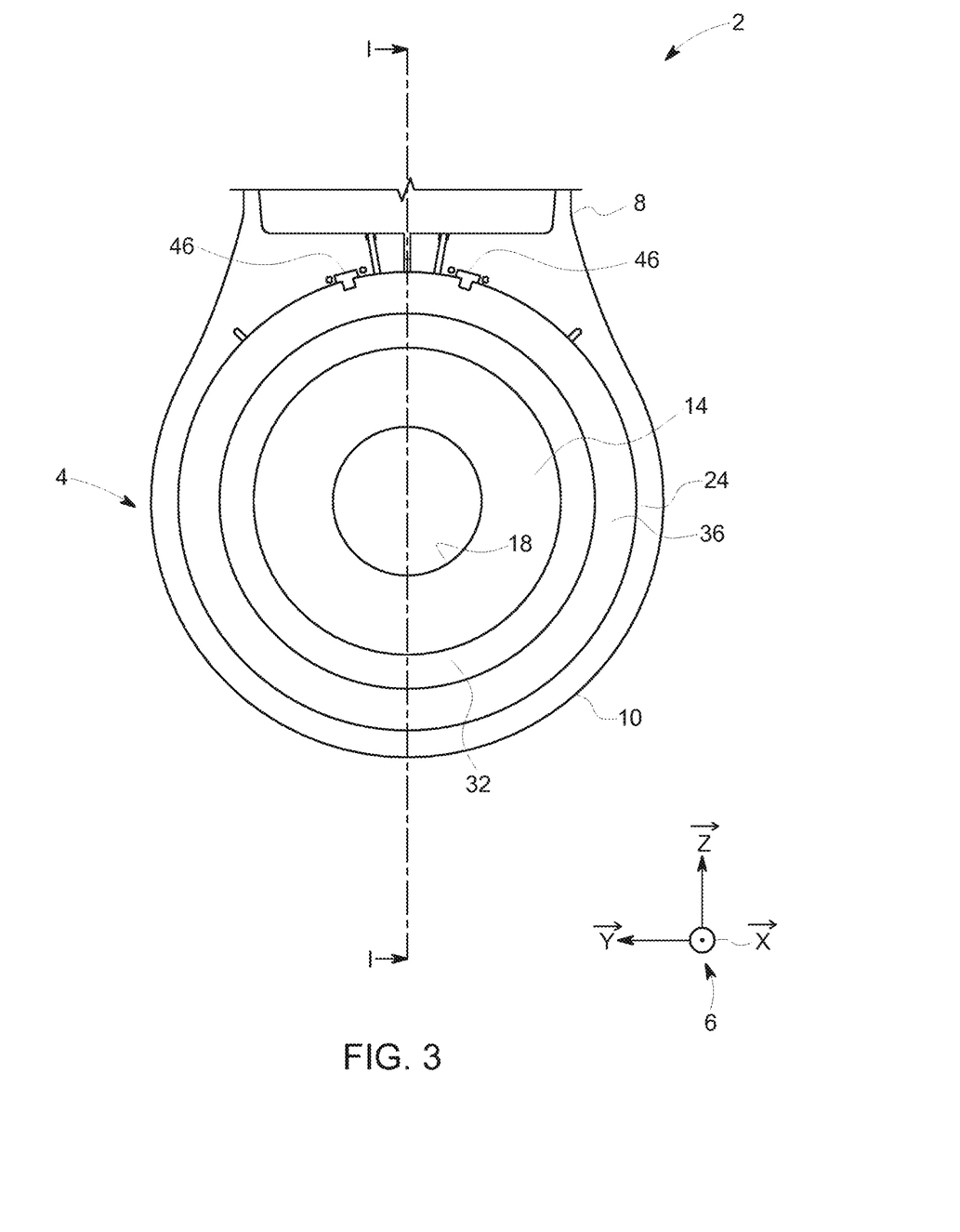
Figure 4:
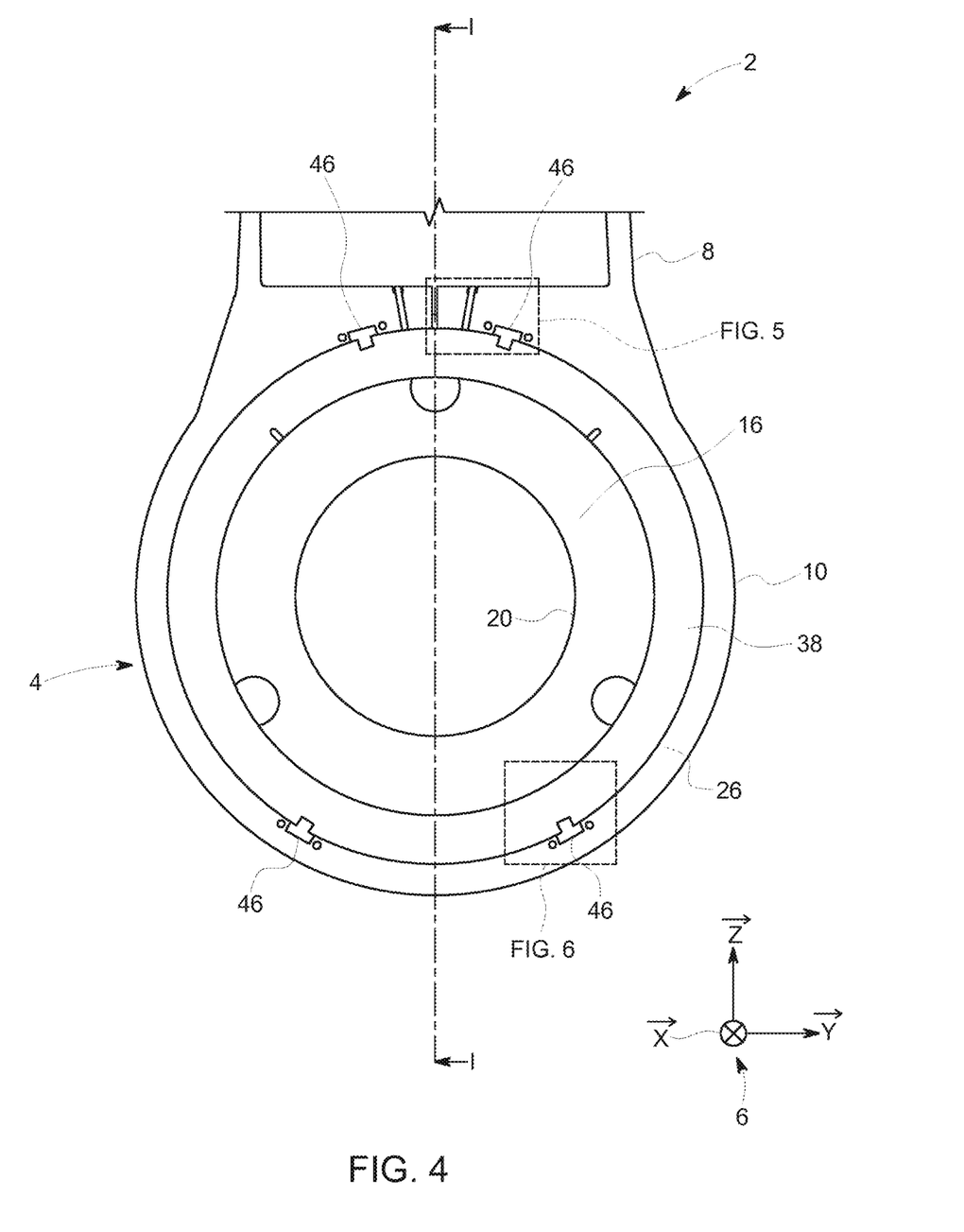
Figure 5:
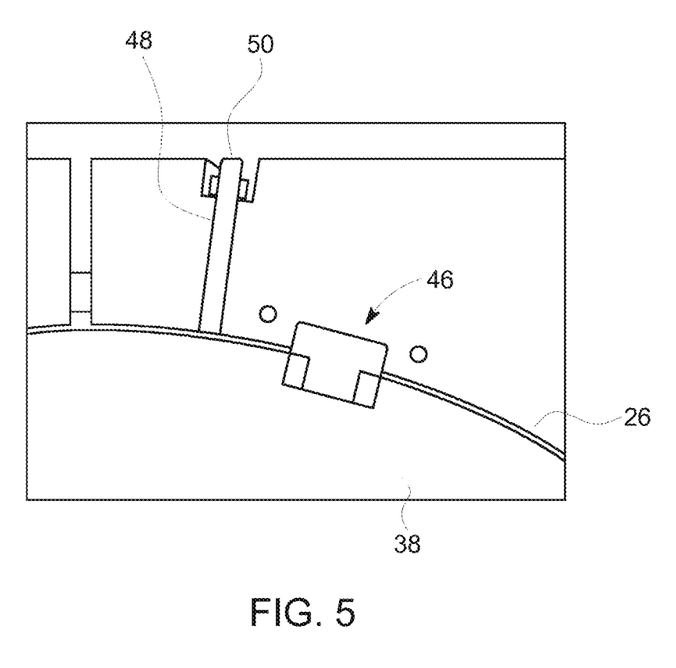

FIGS. 2, 3 and 4 schematically show cross-sectional views of the pod 2. The cutting plane of FIG. 2 is the plane perpendicular to the vector $\vec{x}$ containing the flange 22. The cutting plane of FIG. 3 is the plane perpendicular to the vector $\vec{x}$ containing the flange 24. The cutting plane of FIG. 4 is the plane perpendicular to the vector $\vec{x}$ containing the flange 26.

The pod 2 includes an electric motor 28. The motor 28 is intended to rotate the propulsion shaft with respect to the housing 4. The motor 28 includes a stator 29 and a rotor 32. The stator 29 and the rotor 32 are coaxial around the axis 12. In a manner conventional per se, the stator 29 and the rotor 32 comprise windings made of electrically conductive material allowing to generate an electromagnetic stress driving the rotation of the rotor 32 with respect to the stator 29 about the axis 12. In the example illustrated, the windings forming the rotor 29 and the stator 32 are impregnated in a matrix by a method for vacuum impregnation under pressure. This method is also known by the Anglo-Saxon name "vacuum pressure impregnation", or by the corresponding acronym "VPI".

More particularly, in the example illustrated, the stator 29 comprises in particular a first portion 30 and a second portion 31. The first and second portions 30 and 31 are substantially identical, coaxial around the axis 12.

The stator 29 includes a first end flange 34, an intermediate flange 36 and a second end flange 38. The flanges 34, 36 and 38 are substantially identical. The flange 36 is axially disposed between the portions 30 and 31. The flange 34 is disposed at an axial end of the stator 29 adjacent to the portion 30. The flange 38 is disposed at an axial end of the stator 29 adjacent to the portion 31. The flanges 34, 36 and 38 are respectively visible in FIGS. 2, 3 and 4.

According to the invention, the housing 4 and the stator 29 form an integral assembly (E). The means allowing to create an integral assembly comprising in particular the housing 4 and the stator 29 will now be described.

The pod 2 comprises four means 40 for axial stoppage. In this case, two means 40 for axial stoppage are visible in the cross-sectional view of FIG. 1. Each means 40 is composed of a plate 42 attached to the surface 11. The plate 42 is integral with a rod 44 in axial contact with the flange 34. The four means 40 are designed in such a way as to be able to support a maximum axial stress of 125 tonnes, or 1250N. Thus, the axial stress tending to move the stator 29 in the direction opposite to that of the vector $\vec{x}$, resulting from the action of the propulsion means on the water, is prevented by the four means 40.

In order to ensure the locking according to the radial orientation and according to the tangential orientation of the integral assembly, ten means for point-to-point attachment 46 are provided. In this case, four means 46 are radially placed between the flanges 22 and 34, two means 46 are radially placed between the flanges 24 and 36 and four means 46 are radially placed between the flanges 26 and 38. The operation of the means 46 is further described in detail below.

As illustrated in FIGS. 2 to 5, the pod 2 further includes six radial bores 48. The bores 48 receive a pressure bolt 50. For each flange 22, 24 and 26, two bores 48 and two bolts 50 are provided. Each bolt 50 can be moved radially with respect to the housing 4 in such a way as to exert a radial stress on one of the flanges 34, 36 and 38.

Figure 6:
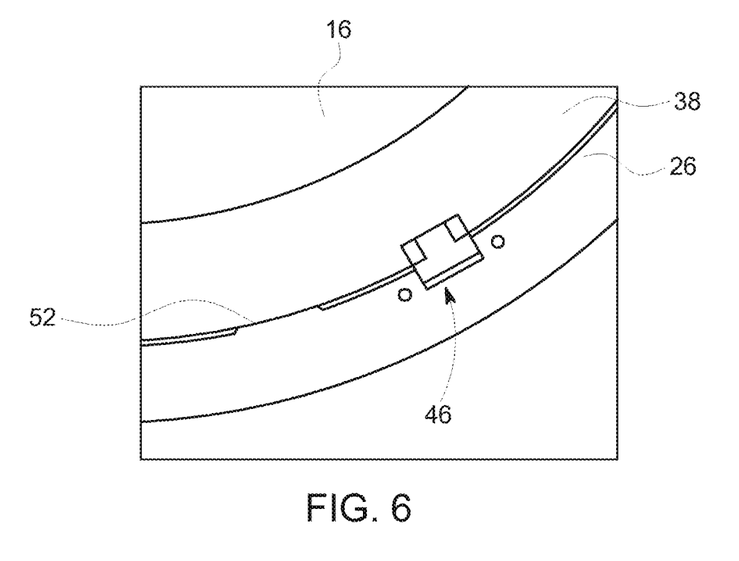

As illustrated in FIG. 6, the flange 26 includes a pressure surface 52. The surface 52 consists of a protrusion protruding radially towards the inside from the inner cylindrical surface of the flange 26. Because of the small thickness of the protrusion forming the surface 52, the pressure surfaces 52 of the flanges 22 and 24 are not visible in FIGS. 1 to 4. However, the flange 22 comprises two pressure surfaces 52 identical to the surfaces 52 of FIG. 6 and located facing the two respective bores 48. Likewise, the flange 24 comprises two pressure surfaces 52 also identical to the surfaces 52 of the flanges 22 and 26.

As visible in FIGS. 2 to 4, the means 46 located in an upper half of the portion 10 are respectively located in an oriented angular sector between 0° and 40°, and in an oriented angular sector between 0° and −40°, around the axis 12 when considering that the vector $\vec{z}$ corresponds to the zero angle. Preferably, these means 46 are respectively located in an oriented angular sector between 5° and 30° and in an oriented angular sector between −5° and −30°. Even more preferably, these means 46 are respectively located in an oriented angular sector between 8° and 20° and in an oriented angular sector between −8° and −20°. The means 46 located in the lower part of the portion 10 are respectively located in an oriented angular sector between 140° and 180°, and in an oriented angular sector between 180° and 220°, around the axis 12 when considering that the vector $\vec{z}$ corresponds to the zero angle. Preferably, these means 46 are respectively located in an oriented angular sector between 140° and 166° and in an oriented angular sector between 194° and 220°. Even more preferably, these means 46 are respectively located in an oriented angular sector between 145° and 162° and in an oriented angular sector between 198° and 215°. More precisely, each means 46 is received in a groove made in the corresponding flange 22, 24 or 26. This groove extends radially towards the outside from the inner cylindrical surface of said flange 22, 24 or 26. Said means 46 is also received in a groove made in the corresponding flange 34, 36 or 38. This groove extends radially towards the inside from the outer cylindrical surface of said flange 34, 36 or 38.

For each flange 22, 24 or 26, an orifice 48 and a bolt 50 are located in an oriented angular sector between 1.5° and 6.5°, around the axis 12 when considering that the vector $\vec{z}$ corresponds to the zero angle, and an orifice 48 and a bolt 50 are located in an oriented angular sector between −1.5° and −6.5°, around the axis 12 when considering that the vector $\vec{z}$ corresponds to the zero angle. Preferably, the pairs consisting of an orifice 48 and of a bolt 50 are respectively located in an oriented angular sector between 3° and 5° and in an oriented angular sector between −3° and −5°.

For each flange 22, 24 or 26, a pressure surface 52 is located in an oriented angular sector between 155° and 180°, around the axis 12 when considering that the vector $\vec{z}$ corresponds to the zero angle, and a pressure surface is located in an oriented angular sector between 180° and 205°, around the axis 12 when considering that the vector $\vec{z}$ corresponds to the zero angle. Preferably, the pressure surfaces 52 are respectively located in an oriented angular sector between 160° and 172° and in an oriented angular sector between 188° and 200°.

In reference to FIGS. 7 to 9, a means for point-to-point attachment 46 will now be described in detail. For reasons of clarity of the description, it is supposed that the means 46 shown in FIGS. 7 to 9 corresponds to one of the means 46 radially incorporated between the flange 26 and the flange 38.

The means 46 comprises a main body 54. An orthonormal vector basis 56 attached to the body 54 is defined. The base 56 consists of a vector $\vec{u}$, a vector $\vec{v}$ and a vector $\vec{w}$. The body 54 accepts a plane of symmetry $P_{symmetry}$ perpendicular to the vector $\vec{u}$.

The body 54 comprises in particular a plate 58 perpendicular to the vector $\vec{v}$. The plate 58 comprises two through-holes 60. The holes 60 are cylindrical around the orientation of the vector $\vec{v}$. The holes 60 have the same diameter. The plate 58 comprises four through-holes 62 cylindrical around the orientation of the vector $\vec{v}$. The holes 62 have the same diameter smaller than that of the holes 60. The through-holes 62 comprise an inner thread.

The main body 54 further includes a part 64 having a trapezoidal cross-section. The cross-section of the part 64 according to a cutting plane perpendicular to the vector $\vec{w}$ is a trapezoid, the small side of which is adjacent to the plate 58 and the large side of which is opposite to the plate 58. In other words, with respect to the orientation of the vector $\vec{v}$, the part 64 is defined by a small rectangular face (not labelled) and by a large rectangular face (not labelled). The part 64 is maintained in contact by its small rectangular face with the plate 58 by two attaching screws 66. The part 64 is maintained in contact by its large rectangular face with a secondary plate 68 by a secondary attaching screw 70.

Figure 7:
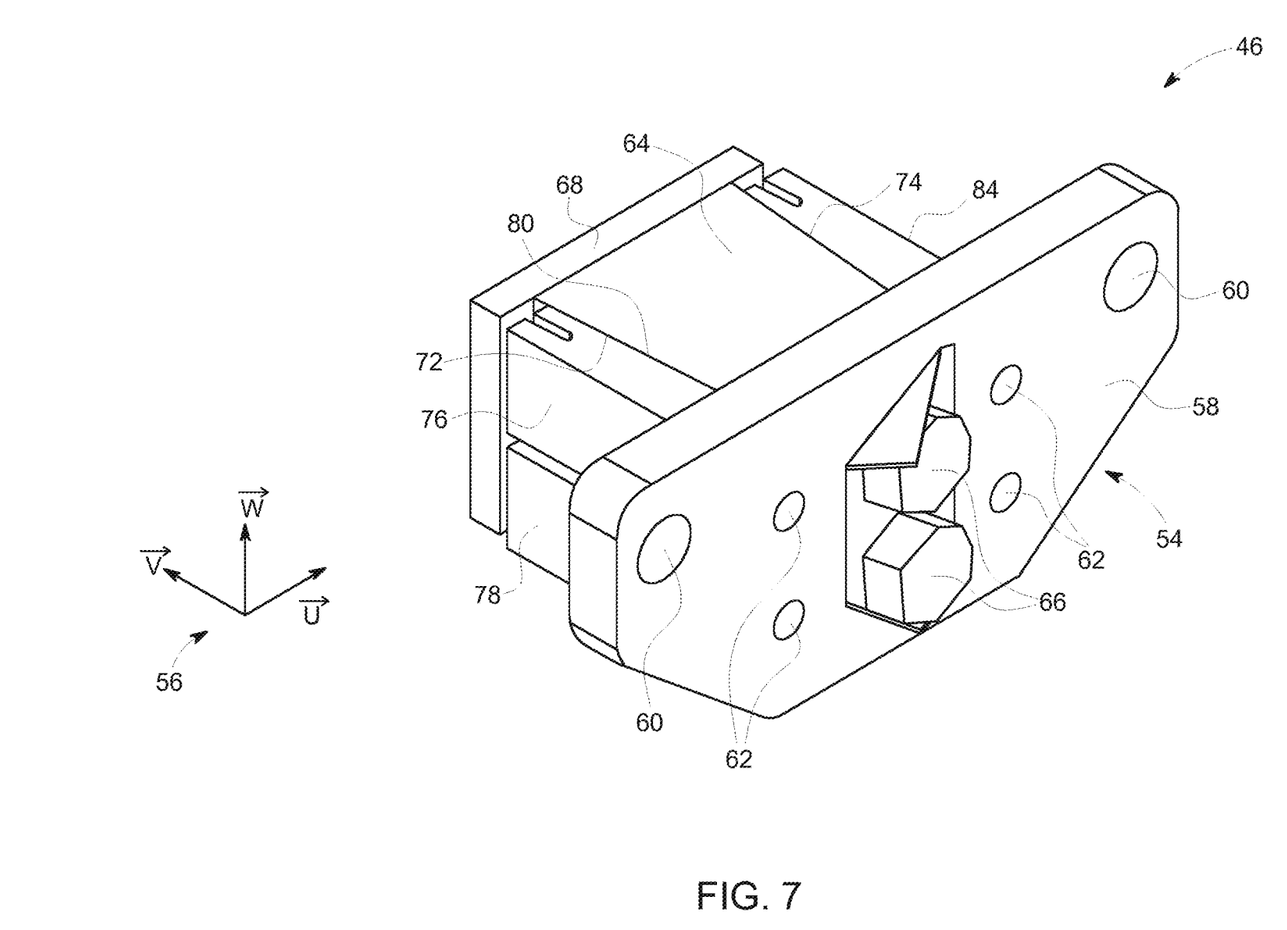
FIG. 7 is a perspective view of a means for point-to-point attachment of the assembly of FIGS. 1 to 6.

With respect to the direction of the vector $\vec{u}$, the part 64 is defined by a first inclined surface 72 and by a second inclined surface 74 (labelled in FIG. 7). The inclined surfaces 72 and 74 form with the vector $\vec{v}$ two opposite angles. In the example illustrated, the angle formed by the inclined surfaces 72 and 74 with respect to the vector $\vec{v}$ is between 2.8° and 3.2° in absolute value.

The means 46 includes a first pair of taper washers comprising a taper washer 76 and a taper washer 78. The washers 76 and 78 are identical. In particular, their cross-section with respect to a cutting plane perpendicular to the vector $\vec{w}$ is a right trapezoid. The washers 76 and 78 include an inclined surface 80 (labelled in FIG. 7) forming an angle with respect to the vector $\vec{v}$ substantially equal to the opposite of the angle between the inclined surface 72 and the vector $\vec{v}$.

The washers 76 and 78 are respectively located facing two through-holes 62. Each washer 76 and 78 can move in translation according to the orientation of the vector $\vec{v}$ with respect to the body 54, via four pins 82. The pins 82 have with the washers 76 and 78 play sufficient for the washers 76 and 78 to be able to also move in translation according to the orientation of the vector $\vec{u}$ over a clearance width Δu.

The washers 76 and 78 are respectively placed facing two orifices 62. To move the washers 76 and 78, a clamping screw (not shown) is used, the shank diameter and the thread of which are adapted to cooperate with the holes 62. By screwing the clamping screw, a pressure is exerted on the taper washer according to the direction and the orientation of the vector $\vec{v}$. The taper washer thus moves in the orientation of the vector $\vec{v}$ towards the plate 68. Via the cooperation of the inclined surfaces 80 and 72, this movement causes another movement of the taper washer in the orientation of the vector $\vec{u}$ and in a direction opposite to that of the vector $\vec{u}$. When the clamping screw is unscrewed, the taper washer is free to move according to the opposite movements.

The means 46 comprises a second pair of taper washers consisting of a taper washer 84 and of a taper washer 86 (not visible in the drawings). The taper washers 84 and 86 have a design identical to the washers 76 and 78, and are mechanically connected to the main body in the same manner. The washers 84 and 86 are located on the other side of the washers 76 and 78 with respect to the plane of symmetry $P_{symmetry}$.

Figure 8:
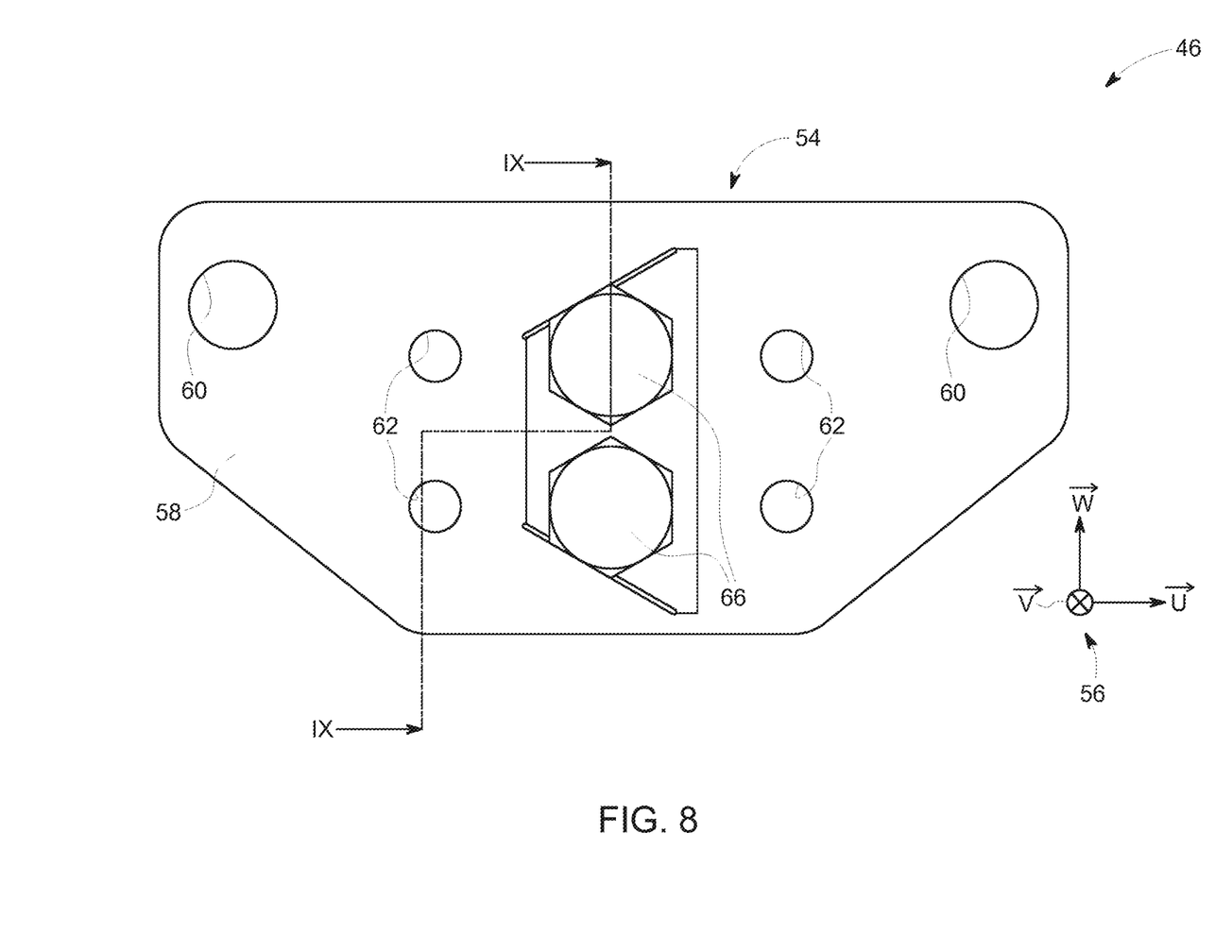
FIG. 8 is a front view of the means for attachment of FIG. 7.
Figure 9:
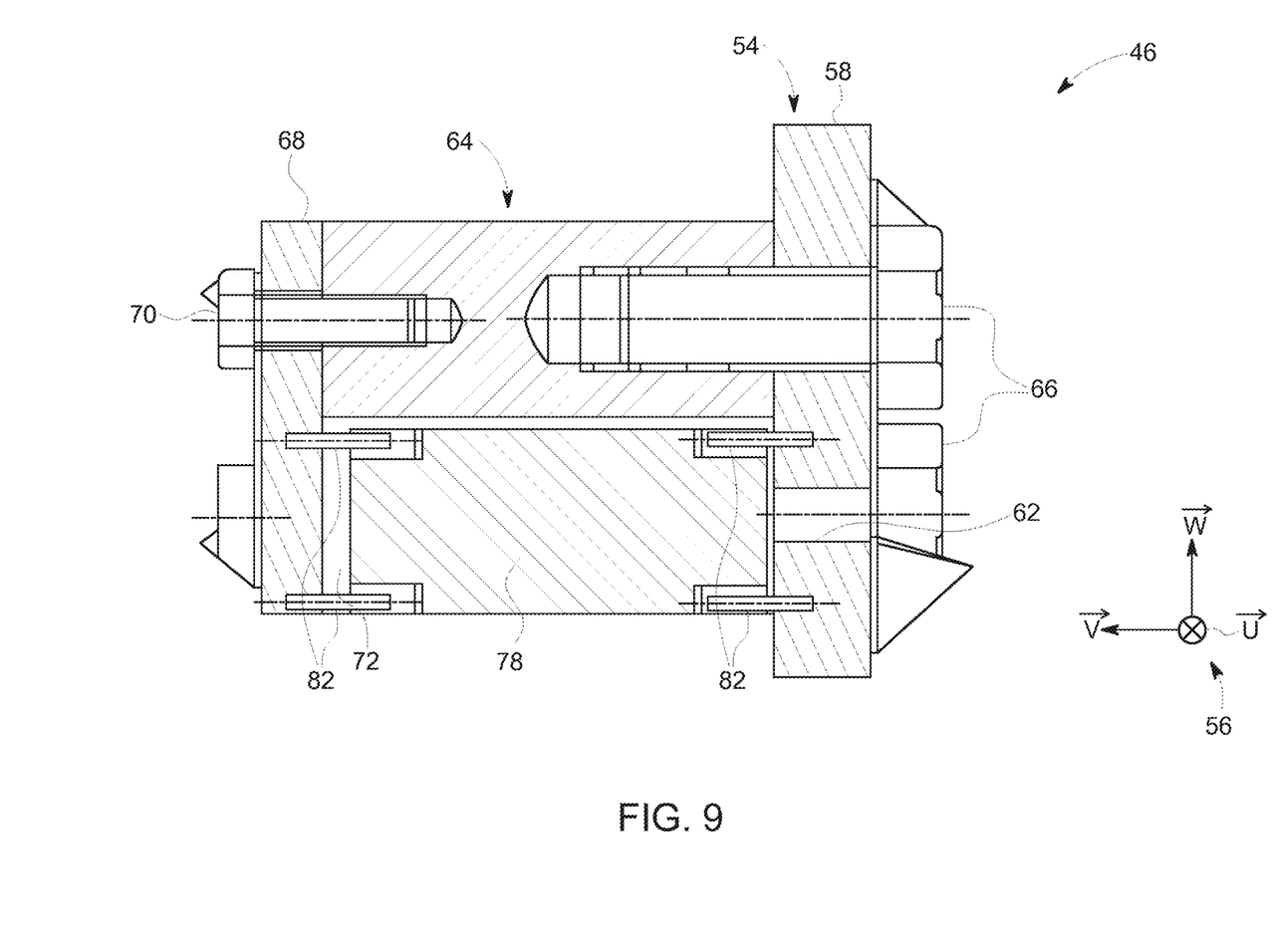
FIG. 9 is a cross-sectional view along the cutting plane IX-IX of the means for attachment of FIGS. 7 and 8.

To attach the stator 29 onto the housing 4 with a view to creating the integral assembly (E), the means for attachment 46 are initially configured as illustrated in FIGS. 7 to 9. In other words, the washers 76, 78, 84 and 86 are adjacent to the plate 58.

When the stator is placed inside the portion 10, an operator introduces the means 46 into the grooves of the flanges 22, 24, 26 and into the grooves of the flanges 34, 36 and 38. With regard to the means 46 shown in FIGS. 7 to 9, the means 46 is inserted inside a groove of the flange 26 and a groove of the flange 38. More precisely, the washers 76 and 84 are introduced into the groove of the flange 26 while the taper washers 78 and 86 are inserted into the groove of the flange 38.

The operator then introduces the clamping screws into the orifices 62. The operator screws the clamping screws. The washers 76, 78, 84 and 86 move according to the orientation and the direction of the vector $\vec{v}$ until stopped against the plate 68. Via the inclined surfaces 72 and 80, the washers 76, 78, 84 and 86 move according to the orientation of the vector $\vec{u}$ so as to move away from the plane of symmetry of the main body 54. Indeed, the washers 76 and 78 move in the direction opposite to the direction of the vector $\vec{u}$ while the washers 84 and 86 move in the direction of the vector $\vec{u}$. The thickness of the means 46 is thus increased according to the orientation of the vector $\vec{u}$ by a value that can reach 2*Δu. The washers 76 and 84 thus exert a normal stress on the walls of the groove of the flange 26. A tangential friction stress attaching the means for attachment 46 to the housing 4 is produced. Likewise, the washers 78 and 86 exert a normal stress on the groove of the flange 38. The tangential friction stress that appears attaches the means 46 to the stator 29. Via the contacts of the washers 76 and 84 with the flange 26 and of the washers 78 and 86 with the flange 38, the means for attachment 46 are adjusted one by one so as to faster the stator 29 onto the housing 4 while avoiding static indeterminacy.

To disassemble the means 46, the operator only has to carry out the reverse actions. The washers 76, 78, 84 and 86 return to their initial position as illustrated in FIGS. 7 to 9. The means 46 can thus be removed easily.

With the pod 2, it is possible to create the integral assembly (E) consisting in particular of the housing 4 and of the stator 29. The means for point-to-point attachment creating the assembly (E) are placed in wisely chosen locations, namely on upper and lower portions of the end flanges and on upper portions of the intermediate flange, and in precise angular sectors around the axis 12. Therefore, the transmission of the deformations and/or of the vibrations from the housing 4 to the stator 29 is made minimal. Moreover, the creation of the assembly (E) is facilitated; it is possible to disassemble the assembly (E) and to readjust the robustness of the embedding link between the stator 29 and the housing 4.

These advantages are crucial in numerous fields of application. In the field of pods, for example, the risk of a failure of the electric motor is limited, and it is possible to replace the stator independently of the housing, and vice versa, or to tighten the stator after an extreme impact.

An example of a method that can be implemented to design and manufacture the pod 2 will now be described in detail.

In a first step, the deformation of the pod 2 following an impact is simulated. In this case, the appearance of an impact on one of the lateral faces of the housing 4 is simulated. To implement this simulation, a finite-elements model of the pod 2 is used.

In a second step, for any point of the housing 4, the variation in the relative position of this point with respect to the axis 12 is determined. Thus, a location of minimal deformation of the cylindrical case following the simulated impact can be found. It is advantageous to compare the variations in relative position with respect to the axis 12, since an overall movement of the pod 2 is taken into account so that the locations of minimal deformation are more quickly identified. In the exemplary embodiment illustrated, ten locations of minimal deformation are determined. Four locations of minimal deformation are located on the flange 22, two locations of minimal deformation are located on the flange 24 and two locations of minimal deformation are located on the flange 26.

In a last step of the method, the means for point-to-point attachment 46 are placed at each location of minimal deformation. More particularly, grooves are made in the flanges 22, 24 and 26 at the locations of minimal deformation. Grooves are then made in the flanges 34, 36 and 38 in angular sectors corresponding to the angular sectors of the locations of minimal deformation. Means for point-to-point attachment are then placed in the grooves made.

Via the method that has just been described, it is possible to design and manufacture an integral assembly having the advantages of the pod 2.

What is claimed is:

1. An assembly, comprising,
a housing and a stator inserted inside a cylindrical cavity of said housing, characterised in that said assembly comprises a means for point-to-point attachment of the stator to the housing,
wherein said means for point-to-point attachment comprises a main body and a taper washer system capable of selectively rigidly connecting the main body to the housing and to the stator, and
wherein said main body comprises a plate having a plane and a part having a trapezoidal cross-section, said means for point-to-point attachment comprising two pairs of taper washers respectively located on either side of a second plane of symmetry (Psymmetry) of the main body, each taper washer being capable of moving in translation with respect to the main body according to a first orientation ($\vec{v}$) perpendicular to the plane of the plate, the inclined surface of each taper washer cooperating with an inclined surface of the part having a trapezoidal cross-section in such a way that the movement in translation according to the first orientation ($\vec{v}$) of said taper washer with respect to the main body in a direction tending to move said taper washer away from the plate causes a movement of the taper washer in translation with respect to the main body according to a second orientation ($\vec{u}$) perpendicular to the second plane of symmetry (Psymmetry) in a direction tending to move it away from the second plane of symmetry (Psymmetry).

2. An assembly of claim 1, wherein said means for point-to-point attachment is capable of implementing a maintaining stress directed according to the radial orientation and/or a maintaining stress directed according to the tangential orientation.

3. An assembly of claim 1, further comprising a first plane of symmetry, said means for point-to-point attachment being located in an angular sector forming an angle of between 0° and 40° with said first plane of symmetry or in an angular sector forming an angle of between 140° and 180° with said first plane of symmetry.

4. An assembly of claim 3, further comprising at least one pressure bolt located in an angular sector forming an angle of between 1.5° and 6.5° with said first plane of symmetry, and at least one pressure surface located in an angular sector forming an angle of between 155° and 180° with said first plane of symmetry.

5. An assembly of claim 3, wherein the stator comprises two end flanges respectively located at the two axial ends of the stator, said assembly comprising, for each end flange of the stator, a first means for point-to-point attachment located in an angular sector forming an angle of between 0° and 40° with said first plane of symmetry, a second means for point-to-point attachment located to be symmetrical to the first means for point-to-point attachment with respect to the first plane of symmetry, a third means for point-to-point attachment located in an angular sector forming an angle of between 140° and 180° with said first plane of symmetry, and a fourth means for point-to-point attachment located to be symmetrical to the third means for point-to-point attachment with respect to the first plane of symmetry.

6. An assembly of claim 5, wherein the stator comprises at least one intermediate flange axially located between the end flanges, said assembly comprising, for each intermediate flange of the stator, a first means for point-to-point attachment located in an angular sector forming an angle of between 0° and 40° with said first plane of symmetry and a second means for point-to-point attachment located to be symmetrical to the first means for point-to-point attachment with respect to the first plane of symmetry.

7. An assembly of claim 1, wherein for each taper washer, the movement of said taper washer with respect to the main body is implemented via a respective clamping screw.

8. A method of simulating the deformation of the housing of an assembly of claim 1, the method comprising, implementing said simulation via a finite-elements model, wherein at least one location of minimal deformation of the housing is determined, and the means for point-to-point attachment is placed at said location of minimal deformation.

9. The method of claim 8, wherein said means for point-to-point attachment is capable of implementing a maintaining stress directed according to the radial orientation and/or a maintaining stress directed according to the tangential orientation.

10. The method of claim 8, further comprising a first plane of symmetry, said means for point-to-point attachment being located in an angular sector forming an angle of between 0° and 40° with said first plane of symmetry or in an angular sector forming an angle of between 140° and 180° with said first plane of symmetry.

11. The method of claim 10, further comprising at least one pressure bolt located in an angular sector forming an angle of between 1.5° and 6.5° with said first plane of symmetry, and at least one pressure surface located in an angular sector forming an angle of between 155° and 180° with said first plane of symmetry.

12. The method of claim 11, wherein the stator comprises two end flanges respectively located at the two axial ends of the stator, said assembly comprising, for each end flange of the stator, a first means for point-to-point attachment located in an angular sector forming an angle of between 0° and 40° with said first plane of symmetry, a second means for point-to-point attachment located to be symmetrical to the first means for point-to-point attachment with respect to the first plane of symmetry, a third means for point-to-point attachment located in an angular sector forming an angle of between 140° and 180° with said first plane of symmetry, and a fourth means for point-to-point attachment located to be symmetrical to the third means for point-to-point attachment with respect to the first plane of symmetry.

13. The method of claim 12, wherein the stator comprises at least one intermediate flange axially located between the end flanges, said assembly comprising, for each intermediate flange of the stator, a first means for point-to-point attachment located in an angular sector forming an angle of between 0° and 40° with said first plane of symmetry and a second means for point-to-point attachment located to be symmetrical to the first means for point-to-point attachment with respect to the first plane of symmetry.

14. The method of claim 8, wherein for each taper washer, the movement of said taper washer with respect to the main body is implemented via a respective clamping screw.

* * * * *